(12) United States Patent
Grounds et al.

(10) Patent No.: US 11,838,311 B2
(45) Date of Patent: *Dec. 5, 2023

(54) SYSTEMS AND METHODS FOR AUTOMATED QUANTITATIVE RISK AND THREAT CALCULATION AND REMEDIATION

(71) Applicant: Verizon Patent and Licensing Inc., Basking Ridge, NJ (US)

(72) Inventors: Gavin Anthony Grounds, Austin, TX (US); David R. Grantges, Jr., Clearwater, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/902,067

(22) Filed: Sep. 2, 2022

(65) Prior Publication Data

US 2023/0007038 A1 Jan. 5, 2023

Related U.S. Application Data

(63) Continuation of application No. 16/796,429, filed on Feb. 20, 2020, now Pat. No. 11,463,468.

(51) Int. Cl.
*H04L 9/40* (2022.01)
*G06F 9/455* (2018.01)
*G06N 20/00* (2019.01)
*G06N 7/01* (2023.01)

(52) U.S. Cl.
CPC ...... *H04L 63/1433* (2013.01); *G06F 9/45558* (2013.01); *G06N 7/01* (2023.01); *G06N 20/00* (2019.01); *H04L 63/1441* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 8,495,746 B2 | 7/2013 | Fissel et al. | |
| 2019/0036805 A1* | 1/2019 | Haye | H04L 43/16 |
| 2020/0097662 A1* | 3/2020 | Hufsmith | H04L 9/0643 |

(Continued)

FOREIGN PATENT DOCUMENTS

| | | | | |
|---|---|---|---|---|
| WO | 2019/200317 | 10/2019 | | |
| WO | WO-2019200317 A1 * | 10/2019 | | G06F 21/45 |

*Primary Examiner* — Joseph P Hirl
*Assistant Examiner* — Hassan Saadoun

(57) ABSTRACT

A system described herein may provide a technique for identifying and remediating potential threat vectors in a system, such as containers or applications in a virtual or cloud computing environment. Attributes of potential threat vectors may be identified, and the potential threat vectors may be scored based on the attributes. Values or scores of individual attributes may be determined through machine learning or other suitable techniques. Scores exceeding a threshold may indicate that a remedial measure should be performed. A remedial measure may be identified using machine learning or other suitable techniques. After the remedial measure is performed, the threat vector may be scored again, and a machine learning model may be refined based on whether the remedial measure was successful.

20 Claims, 9 Drawing Sheets

(56) References Cited

U.S. PATENT DOCUMENTS

2020/0233955 A1\* 7/2020 Ramzan ................ G06F 21/554
2021/0006543 A1\* 1/2021 Deshpande ............. H04L 63/20
2021/0042217 A1\* 2/2021 Hwang ............... G06F 11/3604

\* cited by examiner

| | Mission Critical | Web-based | Confidential | Last Scanned |
|---|---|---|---|---|
| 105 | Mission Critical | Web-based | Confidential | Last Scanned |
| 107 | Yes | Yes | Yes | 30+ days |
| 109 | 10 | 10 | 10 | 10 |
| 123 | Group_1 | Group_1 | Group_2 | Group_2 |
| 125 | 1 | 1 | 0.33 | 0.33 |
| 127 | 10 | 10 | 3.3 | 3.3 |

FIG. 1B

SYSTEMS AND METHODS FOR AUTOMATED QUANTITATIVE RISK AND THREAT CALCULATION AND REMEDIATION

CROSS-REFERENCE TO RELATED APPLICATION(S)

This application is a continuation of U.S. patent application Ser. No. 16/796,429, filed Feb. 20, 2020, the disclosure of which is hereby expressly incorporated herein by reference in its entirety.

BACKGROUND

Entities, such as web-based service providers, cloud infrastructure providers or users, etc., may operate and/or configure systems or services based on the potential presence of risk factors (e.g., system failures or crashes, information theft or other compromise of sensitive information, attacks by malicious actors, denial of service ("DOS") events, etc.). The risk factors may include vulnerabilities or threats that may jeopardize the Quality of Service ("QoS") associated with the systems, potentially disrupting user experience and/or increasing the cost of providing such systems or services.

BRIEF DESCRIPTION OF THE DRAWINGS

FIGS. 1A and 1B illustrate an example overview of one or more embodiments described herein, in which one or more risk scores may be generated for one or more threat vectors (e.g., in a virtualized and/or cloud computing environment);

DETAILED DESCRIPTION OF THE PREFERRED EMBODIMENTS

The following detailed description refers to the accompanying drawings. The same reference numbers in different drawings may identify the same or similar elements.

Embodiments described herein provide for the identification of elements that introduce undue risk within a system, and the remediation of issues (or potential issues) caused by such identified elements. For example, elements of a system may have attributes that, through machine learning and/or other suitable techniques, are attributable to values based on which a risk score can be generated for the elements. For example, an application running in a cloud system may have attributes such as "mission critical," "web-enabled," "confidential," etc. Embodiments described herein may generate a risk score for the application based on these attributes, and may take remedial action if the risk score exceeds a threshold.

Figure 1A:
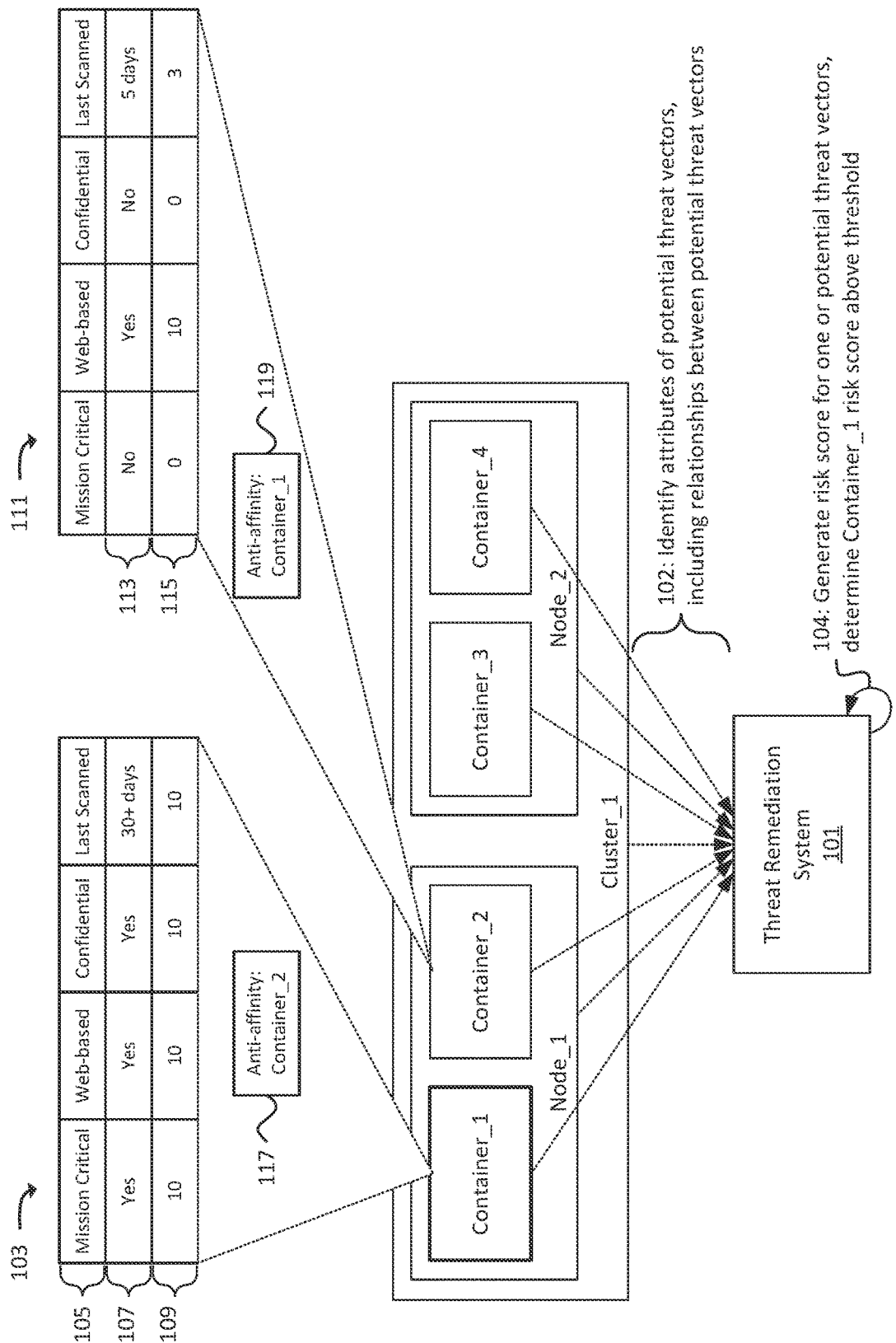

For instance, as shown in FIG. 1A, threat remediation system 101 may communicate with one or more containers (i.e., Container_1, Container_2, Container_3, and Container_4, in this example), which may be or include virtual images, installed or instantiated on one or more nodes (i.e., Node_1 and Node_2, in this example).

A "node," as discussed herein, may refer to a distributed system, a "cloud" device, and/or some other designation of a set of hardware or virtualized resources (e.g., processor resources, memory resources, storage resources, and/or other resources). A particular node may be implemented by multiple hardware devices (e.g., server devices and/or some other type of device), which may be co-located and/or may be located in geographically distinct locations. Threat remediation system 101 may include, and/or may be communicatively coupled to, an orchestration system that provisions virtual machines and/or other virtual functions on a node. For example, threat remediation system 101 and/or the orchestration system and one or more nodes may implement an application programming interface ("API") that allows for threat remediation system 101 and/or the orchestration system to provision resources of the nodes for virtual machines and/or virtual functions). One such API to allow for the provisioning of virtual functionalities on a node is the Kubernetes API.

Nodes may be arranged into clusters. For example, in this example, Node_1 and Node_2 are part of the same cluster, Cluster_1. A cluster may include one node as a "master" or addressable node, which may handle or route intra-cluster communications (e.g., communications between nodes of the same cluster) and/or inter-cluster communications (e.g., communications between nodes of the cluster and devices or systems external to the cluster).

In some embodiments, a given container may correspond to some or all of the functionality of a Virtualized Network Function ("VNF") associated with a wireless telecommunications network. For example, a container may correspond to a User Plane Function ("UPF"), Packet Data Network ("PDN") Gateway ("PGW"), Policy Control Function ("PCF"), Home Subscriber Server ("HSS"), Unified Data Management function ("UDM"), Serving Gateway ("SGW"), Authentication Server Function ("AUSF"), Application Function ("AF"), Access and Mobility Management Function ("AMF"), Session Management Function ("SMF"), Mobility and Management Entity ("MME"), Distributed Unit ("DU"), Control Unit ("CU"), and/or some other device or system of the wireless telecommunications network. Thus, examples described herein, which may involve the instantiating, moving, disabling, etc. of containers, may refer to the modification of the configuration of the wireless telecommunications network, at least inasmuch as VNFs of the wireless telecommunications network may be moved from one node and/or cluster to another node and/or cluster, thereby improving the operation of the wireless telecommunications network.

As shown, threat remediation system 101 may identify (at 102) attributes of potential threat vectors to the system shown in FIG. 1A. For example, threat remediation system 101 may receive attributes of the depicted containers, nodes, and/or cluster. Each container, node, cluster, and/or other aspect of the system may be a discrete threat vector that may be evaluated to determine a risk or threat level of the threat vector, an annualized loss expectancy ("ALE") associated with the threat vector and/or the overall system, etc.

Threat remediation system 101 may receive these attributes from the containers, nodes, or cluster (e.g., via direct communication), and/or may receive these attributes from some other source (e.g., a device or system that communicates with the containers, nodes, and/or cluster). The attributes may describe aspects of the containers, nodes, and/or cluster, and may have been generated or determined using machine learning and/or other automated techniques. Additionally, or alternatively, the attributes may include manually defined or configured attributes.

As an example of the received attributes, threat remediation system 101 may receive attributes 103 associated with Container_1, and attributes 111 associated with Container_2. As shown, attributes 103 and Ill may include fields 105, such as "Mission Critical," "Web-based." "Confidential," and "Last Scanned." As mentioned above, these (and/or other) attributes may be assigned to or correlated with Container_1 and Container_2 based on machine learning and/or other automated techniques. For example, a system configured to analyze and classify containers as having certain attributes, and/or as having particular values 107 associated with attributes, may have analyzed Container_1 to determine that Container_1 is a mission critical container (as denoted by the "Yes" value 107 for the "Mission Critical" field 105), is accessible via a network (as denoted by the "Yes" value 107 for the "Web-based" field 105) such as the Internet), includes material that is confidential (as denoted by the Yes" value 107 for the "Confidential" field 105), and was last scanned for viruses or malware over 30 days ago (as denoted by the "30+ days" value 107 for the "Last Scanned" field 105).

Values 107 may also be associated with scores 109, which may be a normalized representation (e.g., on the same scale, such as 0-10, 0-100, and/or some other suitable scale), of values 107. For example, scores 109 shown in FIG. 1A may be on a scale of 0-10, with a higher score generally corresponding to a higher risk or threat level, and a lower score generally corresponding to a lower risk or threat level. As shown, for instance, the "Yes" value 107 for the "Mission Critical" field 105 for Container_1 may correspond to a score 109 of "10," while the "No" value 113 for the "Mission Critical" field 105 for Container_2 may correspond to a score 115 of "0." Thus, for Container_1, an overall risk score may be increased based on the score of 10 associated with the "Mission Critical" field 105, while an overall risk score for Container_2 may not be increased based on the "Mission Critical" field 105 (i.e., based on the corresponding score of 0).

Further, relationships between potential threat vectors (and/or other attributes of the system) may be evaluated to determine a risk score associated with a given potential threat vector. For example, Container_1 may have been indicated (e.g., determined based on machine learning and/or other suitable techniques) as having an anti-affinity with Container_2. An "anti-affinity" may indicate a constraint that two containers should not be installed on the same node, in the same cluster, and/or some other similar constraint. In some embodiments, threat remediation system 101 may determine or modify an overall risk score for Container_1 based on the anti-affinity 117 with Container_2, and based on the presence of Container_1 and Container_2 on the same node (i.e., Node_1). In some embodiments, threat remediation system 101 may further determine or modify the risk score for Container_2 based on the anti-affinity 117 associated with Container_1. Additionally. or alternatively, threat remediation system 101 may determine or modify the risk score for Container_1 based on the anti-affinity 119 associated with Container_2 (i.e., indicating that Container_2 has an anti-affinity with Container_1), and/or may determine or modify the risk score for Container_2 based on the anti-affinity 119 associated with Container_2. While not shown here, similar concepts may apply for affinities between different attributes or potential threat vectors in a system.

While examples are discussed herein the context of Container_1 and Container_2 being evaluated, similar concepts may apply to the other containers shown in FIG. 1A, as well as to nodes, clusters, applications, hardware configurations, or other elements of a system.

In some embodiments, different categories or groups of attributes may be associated with different weights, based on which the overall risk score may be determined. For example, as shown in FIG. 1B, data structure 121 may conceptually reflect some of the scores for the attributes of Container_1, adjusted by weights for groups with which the attributes are associated. For instance, row 123 may indicate the group of a particular attribute, row 125 may indicate the weight associated with the group, and row 127 may indicate the weighted score for a given attribute. The groups may have been determined or generated based on machine learning and/or other suitable techniques, such as by a device or system that analyzes attributes and categorizes the attributes into suitable groups. Further, the weights may be adjusted or refined via an ongoing machine learning process, and/or may be adjusted or defined manually.

As illustrated, the "Mission Critical" and "Web-based" attributes may be associated with Group_1, and the "Confidential" and "Last Scanned" attributes may be associated with Group_2. As further shown, the weight associated with Group_1 may be "1," while the weight associated with Group_2 may be "0.33." Thus, the weighted scores 127 associated with the above-mentioned factors in this example are 10, 10, 3.3, and 3.3.

Returning to FIG. 1A, based on the attributes associated with the potential threat vectors (e.g., based on the scores 109, 115, and/or weighted scores, such as weighted scores 127), threat remediation system 101 may generate (at 104) one or more risk scores associated with the potential threat vectors. For example, threat remediation system 101 may generate an overall risk score of 36.6 for Container_1, which may be based on weighted scores 127 and anti-affinity 117 (e.g., a score of "10" indicating the anti-affinity with Container_2). In some embodiments, the overall risk score may be calculated using other methodologies, such as using an average, median, minimum, maximum, etc.

In some embodiments, threat remediation system 101 may automatically set the overall risk score to a certain value based on certain factors or attributes. For example, in some embodiments, the overall risk score for Container_1 and/or Container_2 may be automatically set to a maximum level, regardless of other factors, based on the anti-affinity between Container_1 and Container_2.

Figure 2A:
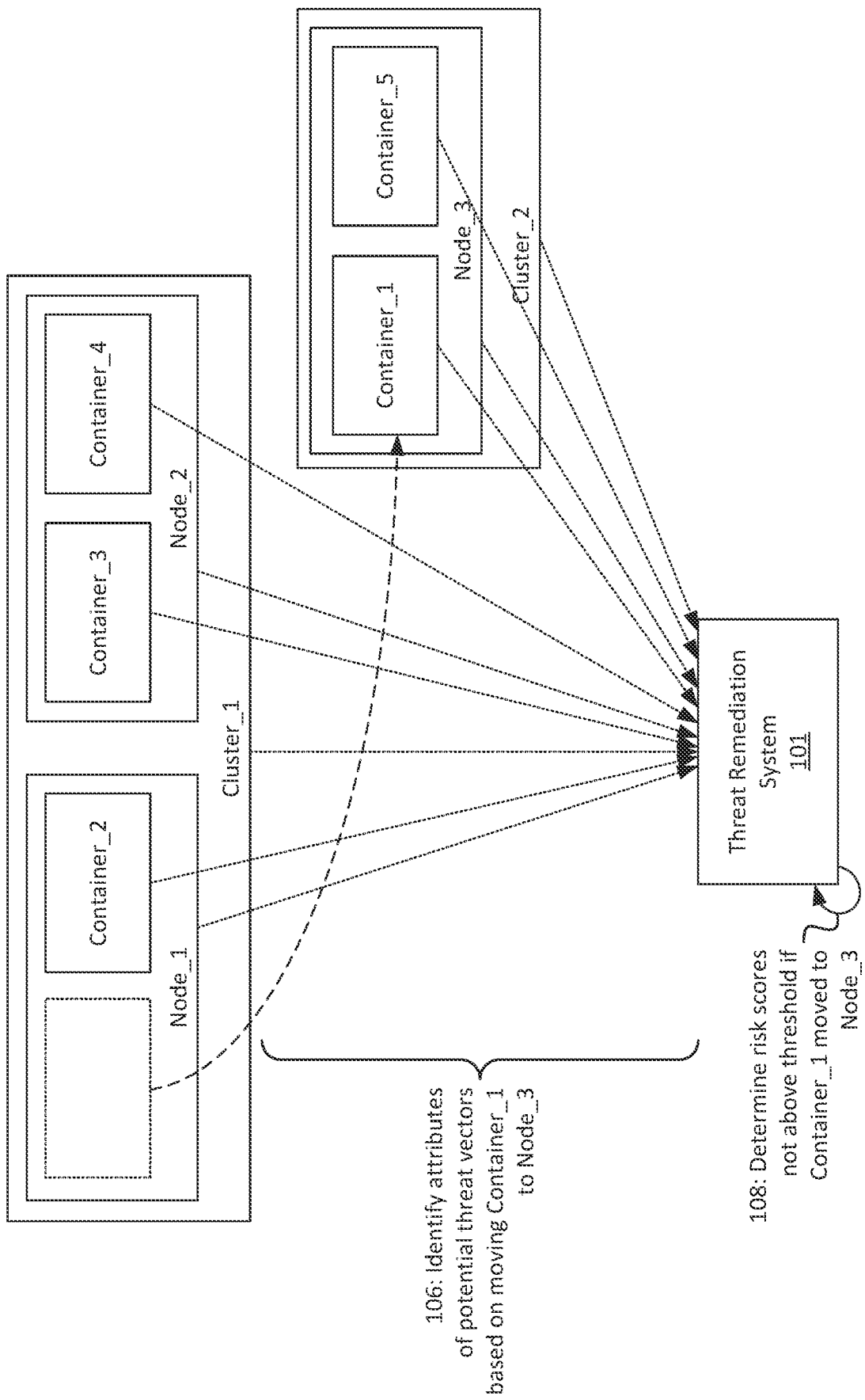
FIG. 2A illustrates an example remediation of potential threat in accordance with some embodiments, which may include moving a virtualized container, which has been identified as having a high risk score (e.g., greater than a threshold), from a first node and/or cluster to a different node and/or cluster.

In the example of FIG. 1A, assume that threat remediation system 101 has determined (at 104) that the overall risk score associated with Container_1 exceeds a threshold risk score. As shown in FIGS. 2A-2D, threat remediation system 101 may take various remedial measures based on the risk score exceeding the threshold value. For example, as shown in FIG. 2A, threat remediation system 101 may cause Container_1 (i.e., the container identified as having the excessive risk score) to be moved from Node_1 of Cluster_1 to another node, such as Node_3 of Cluster_3. For example, threat remediation system 101 may communicate with an orchestration system to cause resources of Node_3 to be provisioned to host Container_1, may obtain state information and/or other portability information from Node_1 and/or Container_1 while running on Node_1, and instantiate Container_1 on Node_3 (e.g., using the state information) in order to allow Container_1 to continue to operate.

After moving Container_1 to Node_3, threat remediation system 101 may identify (at 106) attributes of potential threat vectors of the system, such as attributes associated with the illustrated containers, nodes, clusters, etc., including relationships between the threat vectors (e.g., affinities or anti-affinities). Threat remediation system 101 may generate (or regenerate) the risk scores (e.g., weighted risk scores) associated with the potential threat vectors, and may determine (at 108) whether the risk scores associated with the various potential threat vectors are above the threshold.

If the risk scores are below the threshold, then the moving of Container_1 to Node_3 may be considered a successful move, and threat remediation system 101 may maintain information regarding circumstances of the move (e.g., attributes of one or more the potential threat vectors before and/or after the move). This information may be used to refine a predictive machine learning model that may be used in future situations with similar circumstances (e.g., similar attributes). If, on the other hand, the risk scores are above the threshold, then the moving of Container_1 to Node_3 may be considered an unsuccessful move, and threat remediation system 101 may maintain information regarding circumstances of the move, to prevent similar moves being made under similar circumstances.

Figure 2B:
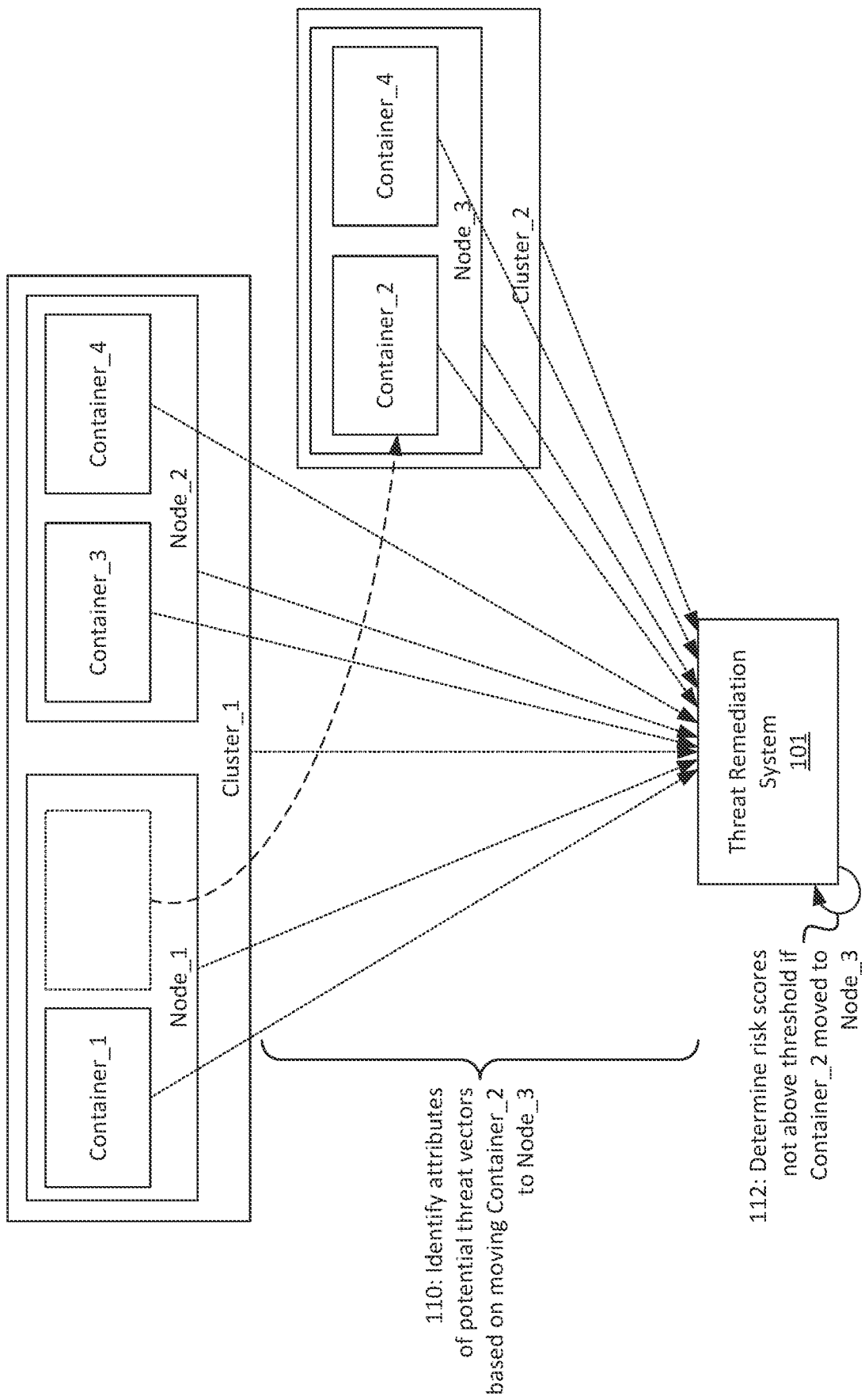
FIG. 2B illustrates an example remediation of potential threat in accordance with some embodiments, which may include moving a first virtualized container, which is configured on a same node as a second virtualized container that has been identified as having a high risk score, from the same node as the second container to a different node.

In some embodiments, threat remediation system 101 may perform different remedial actions, and/or may simulate the performance of multiple remedial actions, and may select one particular remedial action based on suitable criteria (e.g., overall system performance, reduction of individual or overall risk scores, reduction of resources used, etc.). For example, FIG. 2B illustrates another remedial action that may be taken (or simulated) by threat remediation system 101. As shown in FIG. 2B, threat remediation system 101 may move (or cause to be moved) Container_2 to Node_3 (e.g., a different node than the node on which Container_1 is installed). Threat remediation system 101 may make (or simulate) this move based on a predictive model (e.g., as discussed above), which indicates that moving a container having attributes similar to those of Container_2 in similar circumstances (e.g., when installed on the same node as a container having an anti-affinity as the container, and/or other attributes of containers, nodes, clusters, etc. based on historical information) resulted in a satisfactory result. For example, the satisfactory result may indicate that the resulting move yields risk scores for the system, or components of the system, that are below a threshold.

As similarly discussed above, threat remediation system 101 may determine (at 112) whether the risk scores of the system and/or components of the system are above the threshold. Threat remediation system 101 may maintain information indicating whether the risk scores are above the threshold in order to refine a predictive model (e.g., which may cause a similar move to be made in the future under similar circumstances if the risk scores are above the threshold, and/or which may cause a similar move to be avoided in the future under similar circumstances if the risk scores are not above the threshold). In some embodiments, where FIG. 2B illustrates a simulation of the move, threat remediation system 101 may determine performance key performance indicators ("KPIs") and/or other suitable metrics associated with the move, and may ultimately determine whether to make the move (or another move, or another remedial measure entirely) based on the KPIs and/or other metrics associated with the move and/or other potential remedial measures.

Figure 2C:
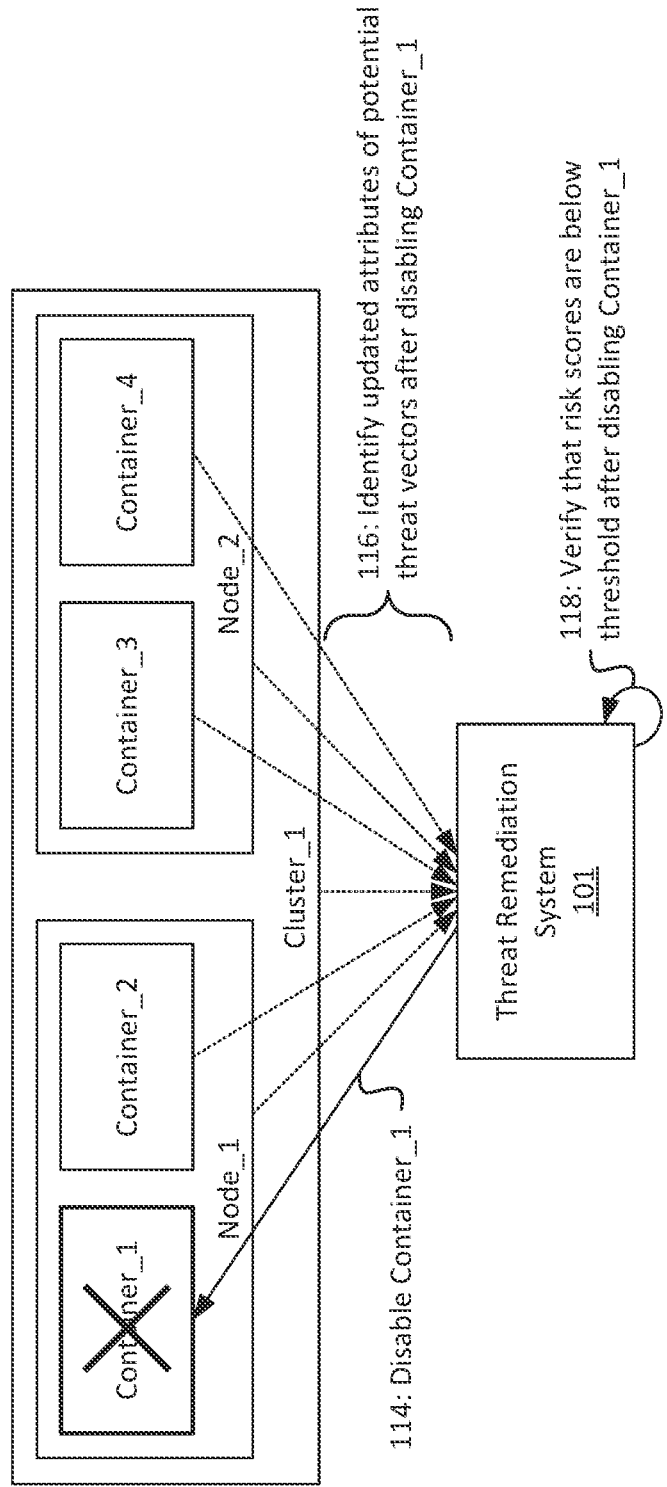
FIG. 2C illustrates an example remediation of potential threat in accordance with some embodiments, which may include disabling or uninstalling a virtualized container, which has been identified as having a high risk score.

FIG. 2C illustrates another potential remedial measure that may be taken (or simulated) by threat remediation system 101. In some embodiments, for example, threat remediation system 101 may simulate the moves shown in FIGS. 2A and 2B, as well as the remedial measures shown in FIG. 2C, and may ultimately select a particular remedial measure to take. As shown in FIG. 2C, for example, threat remediation system 101 may disable (at 114) Container_1. For example, threat remediation system 101 may cause an orchestration system to communicate with Container_1, Node_1, and/or Cluster_1, to uninstall, deprovision, and/or take some other similar measure pertaining to Container_1.

After disabling Container_1, threat remediation system 101 may identify (at 116) updated attributes of other components of the system (e.g., Container_2, Container_3, Container_4, Node_1, Node_2, and/or Cluster_1). As similarly discussed above, threat remediation system 101 may determine (at 118) whether the risk scores associated with the system are below a threshold. Threat remediation system 101 may also use this information to refine a predictive model and/or to ultimately select a remedial measure to take.

Figure 2D:
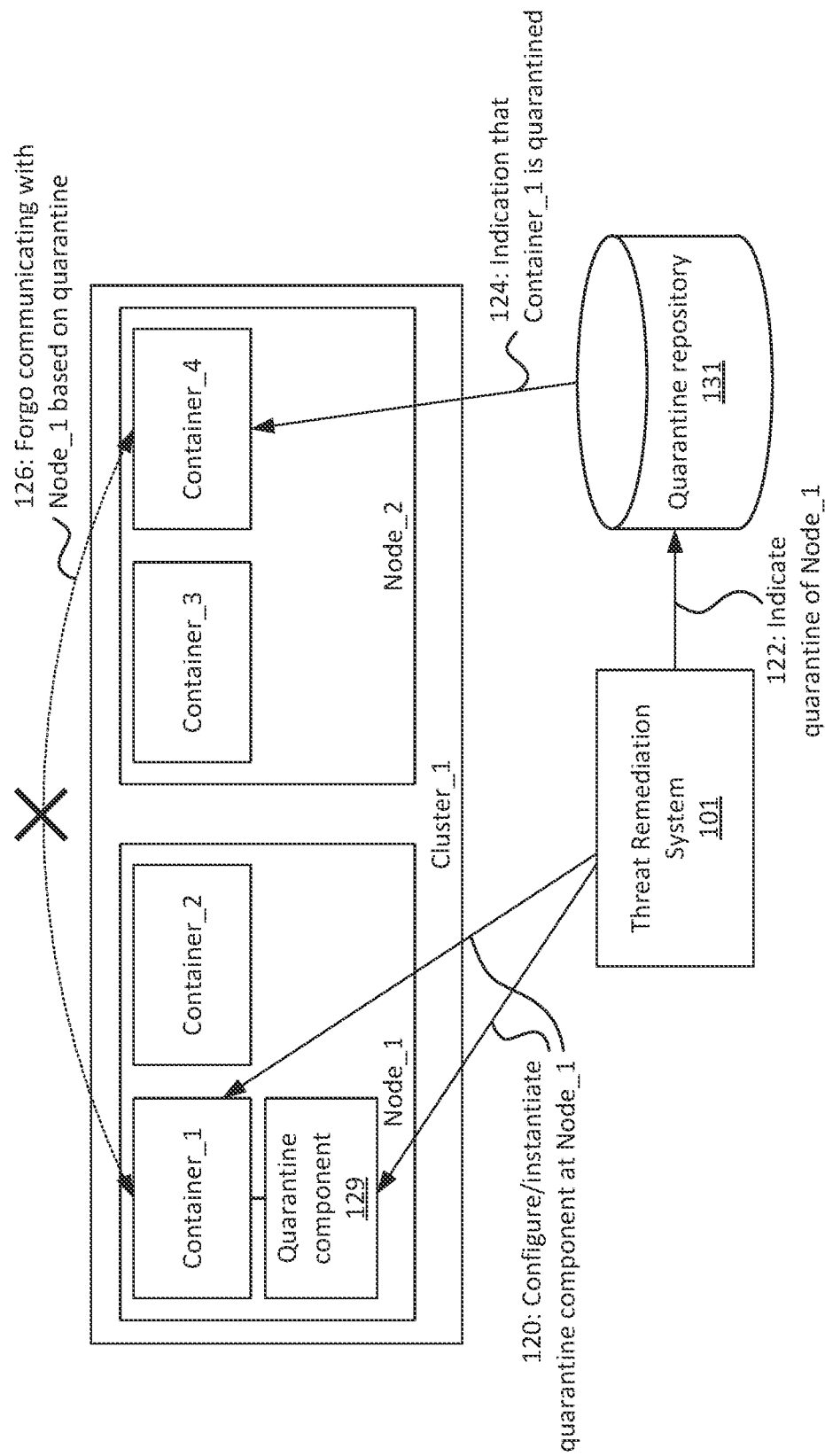
FIG. 2D illustrates an example remediation of potential threat in accordance with some embodiments, which may include quarantining a virtualized container, which has been identified as having a high risk score.

FIG. 2D illustrates another potential remedial measure that may be taken (or simulated) by threat remediation system 101. As shown, threat remediation system 101 may quarantine Container_1. For example, threat remediation system 101 may configure or instantiate quarantine component 129 at Node_1. Quarantine component 129 may be configured to receive, inspect, intercept, etc., traffic or data that is sent and/or received by Container_1. As similarly discussed above, the parameters used to configure quarantine component 129 (e.g., whether to block all inbound and/or outbound traffic associated with Container_1, whether to block particular types of traffic associated with Container_1, whether to block traffic to and/or from a particular device or system, etc.) may be determined based on machine learning and/or other suitable techniques.

Additionally, or alternatively, threat remediation system 101 may provide (at 122) an indication of the quarantine of Node_1 to a device or system that maintains information regarding quarantined containers or other components (e.g., quarantine repository 131). For example, Container_4 may receive (at 124) an indication that Container_1 is quarantined. Based on this indication, Container_4 may forgo (at 126) communicating with Node_1.

In some embodiments, the calculated risk score for a given system or element of a system may be used to determine or calculate other metrics associated with the system. For example, a risk score for a system (and/or risk scores for elements of the system) may be used with other risk-related metrics, such as delivery risk and/or annualized loss expectancy ("ALE"), to determine an overall level of risk associated with the system or elements of the system. The overall risk for a system may be quantified in terms of risk scores, ALE, delivery risk, and/or a combination thereof.

The use of risk scores (e.g., in lieu of, or in addition to, evaluating risk based on monetary currencies) may be beneficial because using risk scores may provide a consistent relative baseline for comparison and evaluation of risks in context of the operating environment and various threat vectors, and is also free of other complications when measuring based on fiscal currencies, such as, for example, foreign exchange variations. Risk scores may reflect base risk and/or actionable risk for potential threat vectors. Base risk may be based on one or more factors, such as: (a) factors inherent to an application such as application functionality, data elements, number of servers, or number of external third party interfaces, (b) a periodic risk reduction evaluation with strategic actions for risk reduction, and/or (c) one or more other similar factors. Actionable risk may be based on one or more factors, such as: (a) identified security vulnerabilities, (b) non-compliance with rules and/or regulations, (c) a continual evaluation or reporting of identified risk elements, and/or (d) other items that elevate the risk level of a given application but can be mitigated or fixed in some way.

Delivery risk may reflect the potential operational performance impact and potential financial impact resulting in unplanned spend to respond, contain, and/or mitigate issues arising from the materialization of a risk associated with a given element. Delivery risk may, in some scenarios, fluctuate based on multiple variables including the financial cost of services, foreign exchange rates, labor and other resource availability, etc., whereas risk scores, in accordance with some embodiments, may remain constant in the relation to risk materialization.

ALE may reflect the actual cost if a loss event materializes (e.g., availability loss, revenue loss, regulatory fines, etc.). ALE may be modeled using the Factor Analysis of Information Risk ("FAIR") taxonomy and/or using other suitable methodologies. In some embodiments, the risk score for a system or element of the system may be a factor in determining the ALE associated with the system or element of the system.

For example, one manner of defining ALE may include multiplying a Loss Event Frequency by a Loss Event Magnitude. Loss Event Frequency may be based on one or more of: (a) how often a loss event might materialize in a given year, which may be expressed as a Threat Event Frequency (e.g., how often a threat or attack occurs) multiplied by Susceptibility (e.g., how likely the threat or attack is to succeed). ALE may, in some embodiments, further be based on the magnitude of a given loss.

Figure 3:
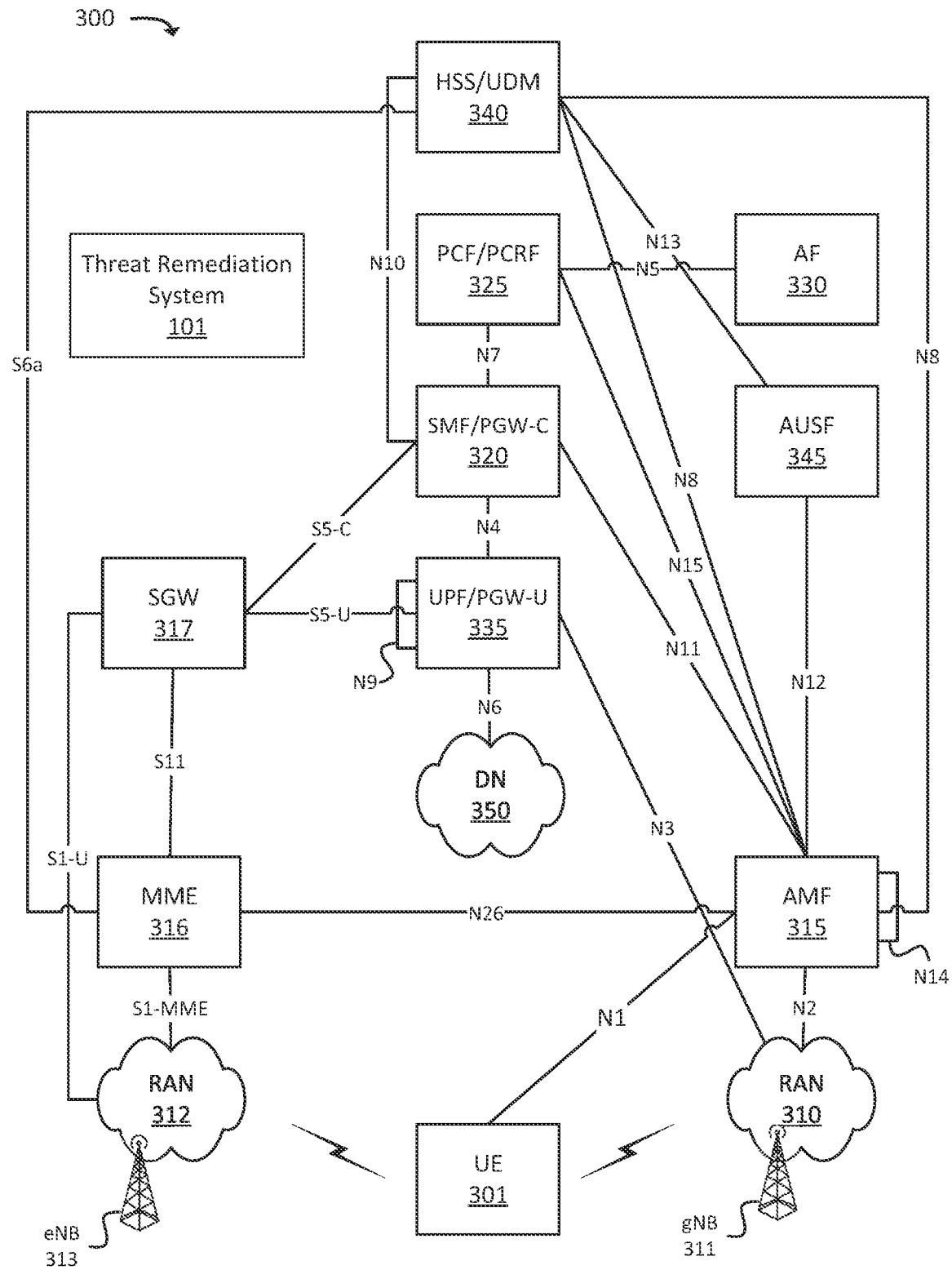
FIG. 3 illustrates an example environment in which one or more embodiments, described herein, may be implemented.

FIG. 3 illustrates an example environment 300, in which one or more embodiments may be implemented. In some embodiments, environment 300 may correspond to a Fifth Generation ("5G") network, and/or may include elements of a 5G network. In some embodiments, environment 300 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 300 may include UE 301, radio access network ("RAN") 310 (which may include one or more Next Generation Node Bs ("gNBs") 311), RAN 312 (which may include one or one or more evolved Node Bs ("eNBs") 313), AMF 315, SMF/PGW-Control plane function ("PGW-C") 320, PCF/Policy Charging and Rules Function ("PCRF") 325, AF 330, UPF/PGW-User plane function ("PGW-U") 335, HSS/UDM 340, AUSF 345, Data Network ("DN") 350, and threat remediation system 101.

The quantity of devices and/or networks, illustrated in FIG. 3, is provided for explanatory purposes only. In practice, environment 300 may include additional devices and/or networks, fewer devices and/or networks, different devices and/or networks, or differently arranged devices and/or networks than illustrated in FIG. 3. For example, while not shown, environment 300 may include devices that facilitate or enable communication between various components shown in environment 300, such as routers, modems, gateways, switches, hubs, etc. Alternatively, or additionally, one or more of the devices of environment 300 may perform one or more functions described as being performed by another one or more of the devices of environment 300. Devices of environment 300 may interconnect with each other and/or other devices via wired connections, wireless connections, or a combination of wired and wireless connections. In some implementations, one or more devices of environment 300 may be physically integrated in, and/or may be physically attached to, one or more other devices of environment 300.

UE 301 may include a computation and communication device, such as a wireless mobile communication device that is capable of communicating with RAN 310 and/or DN 350. UE 301 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, or another type of mobile computation and communication device. UE 301 may send traffic to and/or receive traffic (e.g., user plane traffic) from DN 350 via RAN 310 and UPF/PGW-U 335.

RAN 310 may be, or may include, a 5G RAN that includes one or more base stations (e.g., one or more gNBs 311), via which UE 301 may communicate with one or more other elements of environment 300. UE 301 may communicate with RAN 310 via an air interface (e.g., as provided by gNB 311). For instance, RAN 310 may receive traffic (e.g., voice call traffic, data traffic, messaging traffic, signaling traffic, etc.) from UE 301 via the air interface, and may communicate the traffic to UPF/PGW-U 335, and/or one or more other devices or networks. Similarly, RAN 310 may receive traffic intended for UE 301 (e.g., from UPF/PGW-U 335, AMF 315, and/or one or more other devices or networks) and may communicate the traffic to UE 301 via the air interface.

RAN 312 may be, or may include, an LTE RAN that includes one or more base stations (e.g., one or more eNBs 313), via which UE 301 may communicate with one or more other elements of environment 300. UE 301 may communicate with RAN 312 via an air interface (e.g., as provided by eNB 313). For instance, RAN 310 may receive traffic (e.g., voice call traffic, data traffic, messaging traffic, signaling traffic, etc.) from UE 301 via the air interface, and may communicate the traffic to UPF/PGW-U 335, and/or one or more other devices or networks. Similarly, RAN 310 may receive traffic intended for UE 301 (e.g., from UPF/PGW-U 335, SGW 517, and/or one or more other devices or networks) and may communicate the traffic to UE 301 via the air interface.

AMF 315 may include one or more devices, systems, Virtualized Network Functions ("VNFs"), etc., that perform operations to register UE 301 with the 5G network, to establish bearer channels associated with a session with UE 301, to hand off UE 301 from the 5G network to another network, to hand off UE 301 from the other network to the 5G network, and/or to perform other operations. In some embodiments, the 5G network may include multiple AMFs 315, which communicate with each other via the N14 interface (denoted in FIG. 3 by the line marked "N14" originating and terminating at AMF 315).

SGW 517 may include one or more devices, systems, VNFs, etc., that aggregate traffic received from one or more eNBs 313 and send the aggregated traffic to an external network or device via UPF/PGW-U 335. Additionally, SGW 517 may aggregate traffic received from one or more UPF/PGW-Us 335 and may send the aggregated traffic to one or more eNBs 313. SGW 517 may operate as an anchor for the user plane during inter-eNB handovers and as an anchor for mobility between different telecommunication networks or RANs (e.g., RANs 310 and 312).

SMF/PGW-C 320 may include one or more devices, systems, VNFs, etc., that gather, process, store, and/or provide information in a manner described herein. SMF/PGW-C 320 may, for example, facilitate in the establishment of communication sessions on behalf of UE 301. In some embodiments, the establishment of communications sessions may be performed in accordance with one or more policies provided by PCF % PCRF 325.

PCF/PCRF 325 may include one or more devices, systems, VNFs, etc., that aggregate information to and from the 5G network and/or other sources. PCF/PCRF 325 may receive information regarding policies and/or subscriptions from one or more sources, such as subscriber databases and/or from one or more users (such as, for example, an administrator associated with PCF/PCRF 325).

AF 330 may include one or more devices, systems, VNFs, etc., that receive, store, and/or provide information that may be used in determining parameters (e.g., quality of service parameters, charging parameters, or the like) for certain applications.

UPF/PGW-U 335 may include one or more devices, systems, VNFs, etc., that receive, store, and/or provide data (e.g., user plane data). For example, UPF/PGW-U 335 may receive user plane data (e.g., voice call traffic, data traffic, etc.), destined for UE 301, from DN 350, and may forward the user plane data toward UE 301 (e.g., via RAN 310, SMF/PGW-C 320, and/or one or more other devices). In some embodiments, multiple UPFs 335 may be deployed (e.g., in different geographical locations), and the delivery of content to UE 301 may be coordinated via the N9 interface (e.g., as denoted in FIG. 3 by the line marked "N9" originating and terminating at UPF/PGW-U 335). Similarly, UPF/PGW-U 335 may receive traffic from UE 301 (e.g., via RAN 310, SMF/PGW-C 320, and/or one or more other devices), and may forward the traffic toward DN 350. In some embodiments, UPF/PGW-U 335 may communicate (e.g., via the N4 interface) with SMF/PGW-C 320, regarding user plane data processed by UPF/PGW-U 335.

HSS/UDM 340 and AUSF 345 may include one or more devices, systems, VNFs, etc., that manage, update, and/or store, in one or more memory devices associated with AUSF 345 and/or HSS/UDM 340, profile information associated with a subscriber. AUSF 345 and/or HSS/UDM 340 may perform authentication, authorization, and/or accounting operations associated with the subscriber and/or a communication session with UE 301.

DN 350 may include one or more wired and/or wireless networks. For example, DN 350 may include an Internet Protocol ("IP")-based PDN, a wide area network ("WAN") such as the Internet, a private enterprise network, and/or one or more other networks. UE 301 may communicate, through DN 350, with data servers, other UEs 301, and/or to other servers or applications that are coupled to DN 350. DN 350 may be connected to one or more other networks, such as a public switched telephone network ("PSTN"), a public land mobile network ("PLMN"), and/or another network. DN 350 may be connected to one or more devices, such as content providers, applications, web servers, and/or other devices, with which UE 301 may communicate.

Threat remediation system 101 may include one or more devices or systems that perform one or more operations described herein. For example, threat remediation system 101 may communicate with one or more of the devices, systems, VNFs, or networks shown in FIG. 3, may identify potential threat vectors (e.g., using machine learning and/or other techniques), and may perform remedial actions when detecting risk levels (e.g., risk scores) that exceed a threshold level. As mentioned above, threat remediation system 101 may include, or may be communicatively coupled to, an orchestration system that is capable of receiving information (e.g., diagnostic or monitoring information) from the devices or systems shown in FIG. 3, and is capable of installing or instantiating containers on nodes (e.g., as implemented by physical or virtual hardware). While no explicit connections are shown between threat remediation system 101 and other devices or systems of environment 300, threat remediation system 101 may, in some embodiments, be communicatively coupled to some or all of the devices or systems of environment 300. In some embodiments, the same devices, nodes, clusters, etc., that implement one or more of the devices or systems of environment 300 may implement some or all of the functionality of threat remediation system 101.

Figure 4:
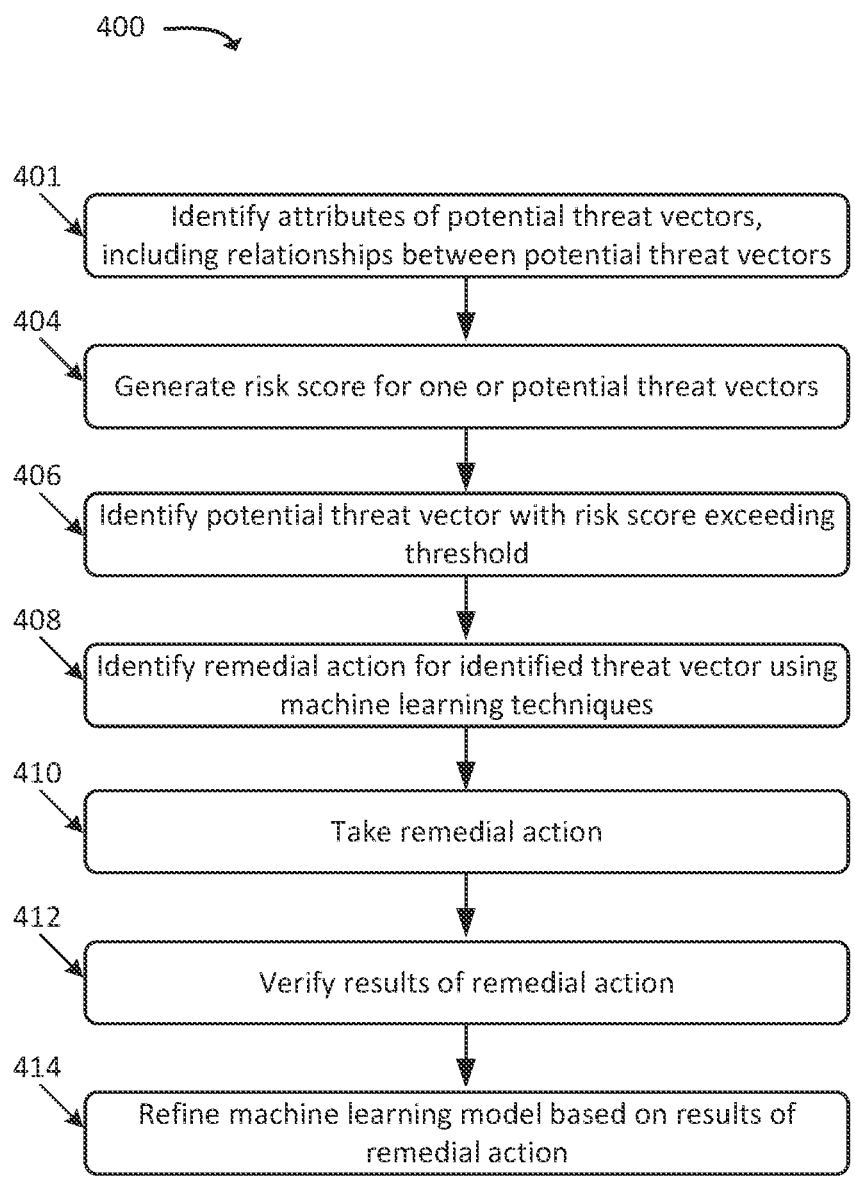
FIG. 4 illustrates an example process for identifying a potential threat vector with a risk score exceeding a threshold and using machine learning techniques to remediate the identified threat vector.

FIG. 4 illustrates an example process 400 for identifying a potential threat vector with a risk score exceeding a threshold and using machine learning techniques to remediate the identified threat vector. In some embodiments, some or all of process 400 may be performed by threat remediation system 101. In some embodiments, one or more other devices may perform some or all of process 400 (e.g., in concert with, and/or in lieu of, threat remediation system 101).

As shown, process 400 may include identifying (at 402) attributes of potential threat vectors, including relationships between potential threat vectors. For example, as discussed above, threat remediation system 101 may identify attributes of a system and/or components of the system to identify aspects of the system (e.g., particular devices or VNFs) which may potentially be associated with risk or loss. The devices, systems, VNFs, etc., may be identified through machine learning techniques, such as supervised or unsupervised learning. K-means clustering, categorization, etc. As discussed above, potential threat vectors may include, or be related to, VNFs or other aspects of a wireless telecommunications network, such as 5G network, and LTE network, a network implementing an NSA architecture, etc.

Process 400 may further include generating (at 404) risk scores for one or more potential threat vectors. For example, as discussed above, threat remediation system 101 may generate one or more risk scores for the potential threat vectors, which may be based on the attributes identified with respect to the potential threat vectors, and may in some embodiments be further based on weights assigned to the attributes.

Process 400 may additionally include identifying (at 406) a potential threat vector with a risk score exceeding threshold. As mentioned above, the threshold may be determined or adjusted automatically (e.g., based on machine learning or other suitable techniques, and/or may be manually determined or adjusted).

Process 400 may also include identifying (at 408) remedial action for identified threat vector using machine learning techniques. For example, threat remediation system 101 may identify past remedial actions that were taken for threat vectors having the same or similar attributes of the identified threat vector. The past remedial actions and/or past threat vectors may be identified using a suitable correlation or similarity analysis. For example, threat remediation system 101 may determine that the present threat vector and the past threat vector(s) have a measure of similarity that exceeds a threshold measure of similarity, based on the similarity analysis.

If the threat vector is a container installed on a node, the attributes may include attributes of the container (e.g., provisioned resources associated with the container, type of container, applications included in the container, etc.), of the node (e.g., used or available resources associated with the node, a cluster on which the node resides, other containers installed on the node, etc.), and/or some other device or system associated with the threat vector. The remedial action may, in some embodiments, be identified based on past remedial actions for threat vectors with a same or similar risk score, and/or for threat vectors with attributes that have the same or similar score as attributes associated with the threat vector (e.g., where a "Mission Critical" attribute associated with the threat vector and the one or more other threat vectors is associated with a score of "10" or a value of "Yes"). The remedial action may also be based on other constraints, rules, attributes, etc. associated with the threat vector and/or other threat vectors with which the threat vector has a relationship. For example, the threat vector may have an anti-affinity with another threat vector (e.g., two containers installed on the same node, in which the two containers have an anti-affinity with each other), based on which the remedial measure may be based on remediating the anti-affinity (e.g., by moving one or both containers, and/or by taking some other suitable measure).

Process 400 may further include taking (at 410) the identified remedial action. For example, threat remediation system 101 may cause the remedial action to be taken, and/or may simulate the results of taking the remedial action. In some embodiments, threat remediation system 101 may communicate with an orchestration system and/or some other type of device or system in order to cause the remedial action to be taken or simulated.

Process 400 may additionally include verifying (at 412) the results of the remedial action. For example, once the remedial action has been taken or has been simulated, threat remediation system 101 may determine one or more metrics that indicate whether the remedial action was successful. For example, as discussed above, threat remediation system 101 may determine (or re-determine) one or more risk scores associated with the threat vector that was remediated. Additionally, or alternatively, threat remediation system 101 may determine other types of scores or metrics, such as performance metrics, ALE-based metrics, and/or other suitable metrics, that indicate whether the remediation was successful.

Process 400 may also include refining (at 414) a machine learning model based on the results of the remedial action. For example, threat remediation system 101 may refine a machine learning model with attributes of the threat vector as well as an indication of the remedial action that was taken. If the remediation was successful (e.g., one or more risk scores and/or other suitable metrics do not exceed a threshold, and/or improve with regard to before the remediation), refining the machine learning model may cause similar threat vectors in the future to be more likely to be remediated in the same way. If, on the other hand, the remediation was not successful (e.g., one or more risk scores and/or other suitable metrics exceed the threshold, and/or do not improve with regard to before the remediation), refining the machine learning model may cause similar threat vectors in the future to be less likely to be remediated in the same way.

As denoted by the dotted line in the figure, some or all of process 400 may repeat on an iterative basis. For example, one or more of blocks 408-414 may be repeated until an optimal configuration is reached. For example, multiple different remedial actions may be simulated (at 410), the results of the multiple remedial actions may be determined and/or verified (at 412), and a particular one of the remedial actions may be selected (e.g., based on the resultant risk scores, performance metrics, changes to ALE, and/or other factors). The machine learning model may be refined (at 414) for each iteration, whether a given remedial action was ultimately selected or not.

In some embodiments, multiple different threat vectors may be identified, with corresponding risk scores (e.g., exceeding a risk score threshold). Threat remediation system 101 may, in some embodiments, prioritize the threat vectors based on the corresponding risk scores, and/or may use the risk scores as a factor in ultimately determining an order in which to remediate the threat vectors. For example, assume that threat remediation system 101 identifies two different containers in a virtualized environment, with two different risk scores that exceed the risk score threshold. Threat remediation system 101 may prioritize the container with the higher risk score (e.g., may take (at 410) a remedial action, verify (at 412) the remedial action, etc., for this container prior to addressing the container with the lesser risk score.

Figure 5:
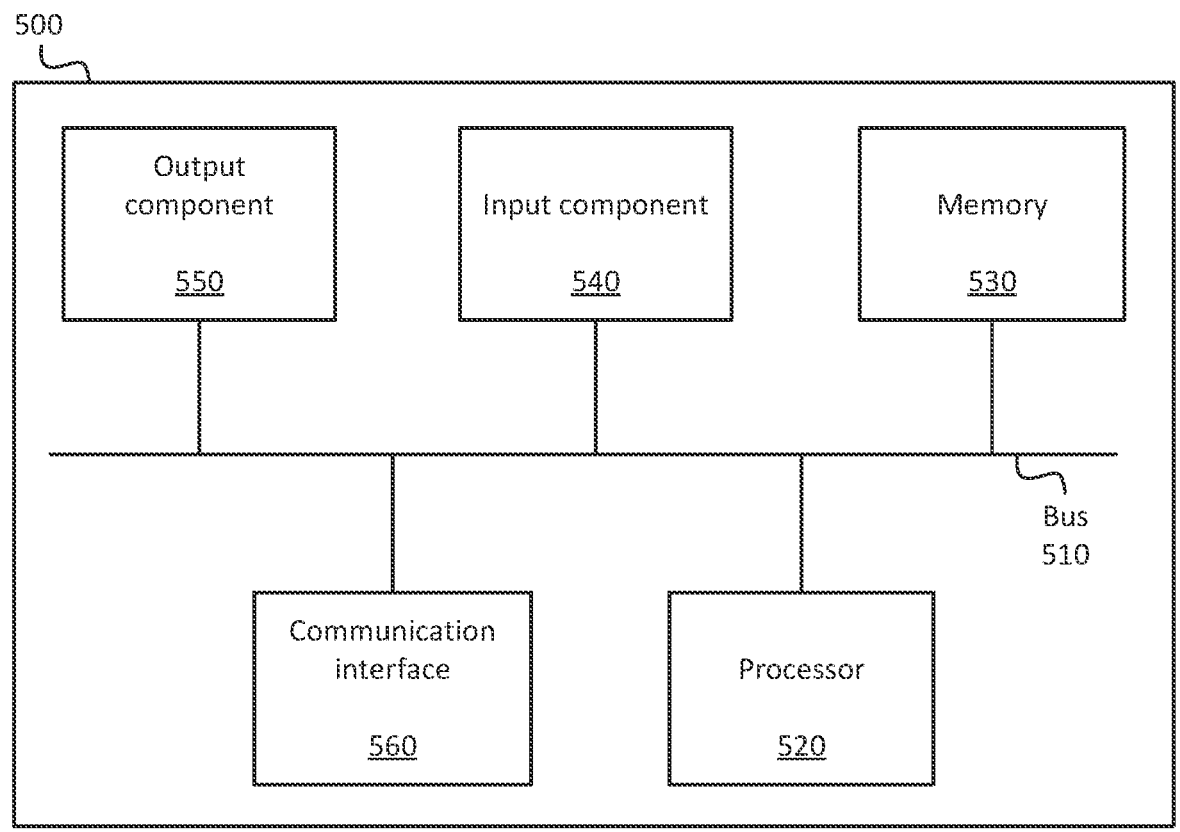
FIG. 5 illustrates example functional components of one or more devices, in accordance with one or more embodiments described herein.

FIG. 5 illustrates example components of device 500. One or more of the devices described above may include one or more devices 500. Device 500 may include bus 510, processor 520, memory 530, input component 540, output component 550, and communication interface 560. In another implementation, device 500 may include additional, fewer, different, or differently arranged components.

Bus 510 may include one or more communication paths that permit communication among the components of device 500. Processor 520 may include a processor, microprocessor, or processing logic that may interpret and execute instructions. Memory 530 may include any type of dynamic storage device that may store information and instructions for execution by processor 520, and/or any type of non-volatile storage device that may store information for use by processor 520.

Input component 540 may include a mechanism that permits an operator to input information to device 500, such as a keyboard, a keypad, a button, a switch, etc. Output component 550 may include a mechanism that outputs information to the operator, such as a display, a speaker, one or more light emitting diodes ("LEDs"), etc.

Communication interface 560 may include any transceiver-like mechanism that enables device 500 to communicate with other devices and/or systems. For example, communication interface 560 may include an Ethernet interface, an optical interface, a coaxial interface, or the like. Communication interface 560 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 500 may include more than one communication interface 560. For instance, device 500 may include an optical interface and an Ethernet interface.

Device 500 may perform certain operations relating to one or more processes described above. Device 500 may perform these operations in response to processor 520 executing software instructions stored in a computer-readable medium, such as memory 530. A computer-readable medium may be defined as a non-transitory memory device. A memory device may include space within a single physical memory device or spread across multiple physical memory devices. The software instructions may be read into memory 530 from another computer-readable medium or from another device. The software instructions stored in memory 530 may cause processor 520 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1A, 2A-2D, and 4), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   receive attribute information for a plurality of containers in a virtualized environment;
   identify, for each attribute associated with a particular container, of the plurality of containers, a value associated with the attribute;
   generate, for each container of the plurality of containers, a score that is based on the respective values associated with the attributes of the each container;
   identify that the generated score for the particular container exceeds a threshold;
   identify a particular remedial action, out of a plurality of candidate remedial actions, to take based on identifying that the generated score exceeds the threshold;
   cause the identified remedial action to be performed;
   recalculate the score for the particular container based on taking the particular remedial action; and
   retain the particular remedial action when the recalculated score does not exceed the threshold.

2. The device of claim 1, wherein the attributes associated with the particular container are associated with a plurality of groups, wherein each attribute associated with the particular container is associated with a particular one of the groups, of the plurality of groups, wherein each group is associated with a different weight.

3. The device of claim 2, wherein the score for the particular container is calculated based on:

the values of the attributes associated with the particular container, and the weights associated with the groups, with which the attributes are associated.

4. The device of claim 1, wherein the generated score and the recalculated score indicate a measure of risk associated with the particular container.

5. The device of claim 1, wherein identifying the particular remedial action includes:
identifying another container for which the same particular remedial action was previously taken;
performing a similarity analysis to identify that the other container and the particular container have a measure of similarity that exceeds a threshold measure of similarity; and
selecting the particular remedial action for the particular container based on identifying that the other container, for which the same particular remedial action was taken, and the particular container have the measure of similarity that exceeds the threshold measure of similarity.

6. The device of claim 1, wherein the one or more processors are further configured to:
refine a machine learning model to indicate that the identified remedial action was selected based on the attributes associated with the particular container.

7. The device of claim 1, wherein a particular attribute, associated with the particular container, includes an anti-affinity between the particular container and another container, wherein the device is further configured to:
identify that the particular container is installed on a same node as the other container for which the particular container has the anti-affinity,
wherein the score is generated further based on identifying that the particular container is installed on the same node as the other container for which the particular container has the anti-affinity.

8. The device of claim 1, wherein the plurality of containers include at least one of a virtual machine, virtual image or virtual network function.

9. The device of claim 1, wherein the device is further configured to:
when the recalculated score exceeds the threshold, identify another remedial action, and cause the another remedial action to be performed.

10. The device of claim 1, wherein the plurality of potential remedial actions includes at least one of:
moving the particular container to a different node within the virtualized environment;
moving a container other than the particular container to a different node within the virtualized environment;
disabling the particular container; or
quarantining the particular container.

11. A method, comprising:
receiving attribute information for a plurality of containers in a virtualized environment;
identifying, for each attribute associated with a particular container, of the plurality of containers, a value associated with the attribute;
generating, for each container of the plurality of containers, a score that is based on the respective values associated with the attributes of the each container;
identifying that the generated score for the particular container exceeds a threshold;
identifying a particular remedial action, out of a plurality of candidate remedial actions, to take based on identifying that the generated score exceeds the threshold;
causing the identified remedial action to be performed;
recalculating the score for the particular container based on taking the particular remedial action; and
retaining the remedial action when the recalculated score does not exceed the threshold.

12. The method of claim 11, wherein the attributes associated with the particular container are associated with a plurality of groups, wherein each attribute associated with the particular container is associated with a particular one of the groups, of the plurality of groups, wherein each group is associated with a different weight.

13. The method of claim 12, wherein the score for the particular container is calculated based on:
the values of the attributes associated with the particular container, and
the weights associated with the groups, with which the attributes are associated.

14. The method of claim 11, wherein the generated score and the recalculated score indicate a measure of risk associated with the particular container.

15. The method of claim 11, wherein identifying the particular remedial action includes:
identifying another container for which the same particular remedial action was previously taken;
performing a similarity analysis to identify that the other container and the particular container have a measure of similarity that exceeds a threshold measure of similarity; and
selecting the particular remedial action for the particular container based on identifying that the other container, for which the same particular remedial action was taken, and the particular container have the measure of similarity that exceeds the threshold measure of similarity.

16. The method of claim 11, further comprising:
refining a machine learning model to indicate that the identified remedial action was selected based on the attributes associated with the particular container.

17. The method of claim 11, wherein a particular attribute, associated with the particular container, includes an anti-affinity between the particular container and another container, the method further comprising:
identifying that the particular container is installed on a same node as the other container for which the particular container has the anti-affinity,
wherein the score is generated further based on identifying that the particular container is installed on the same node as the other container for which the particular container has the anti-affinity.

18. The method of claim 11, wherein the plurality of containers include at least one of a virtual machine, virtual image or virtual network function.

19. The method of claim 11, further comprising:
when the recalculated score exceeds the threshold, identifying another remedial action, and causing the another remedial action to be performed.

20. The method of claim 11, wherein the plurality of potential remedial actions includes at least one of:
moving the particular container to a different node within the virtualized environment;
moving a container other than the particular container to a different node within the virtualized environment;
disabling the particular container; or
quarantining the particular container.

* * * * *